May 24, 1932.  F. J. WALLENBERG ET AL  1,859,545
BATTERY TERMINAL
Filed March 21, 1927
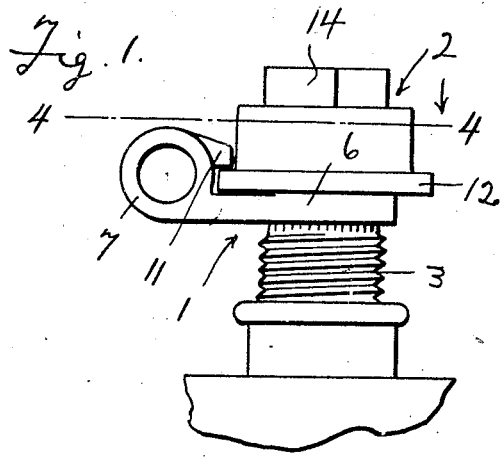
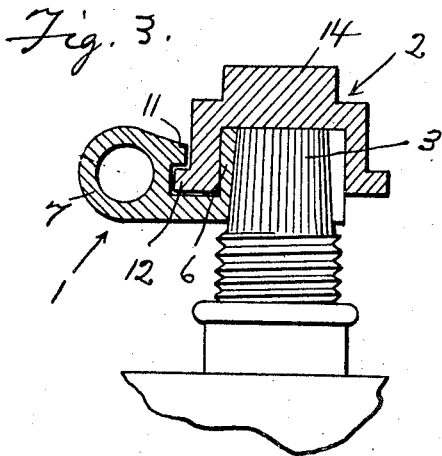
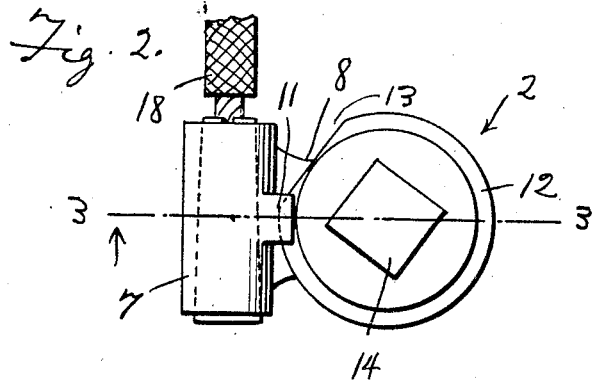
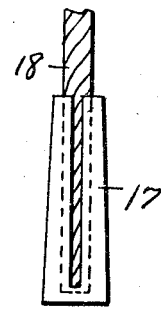
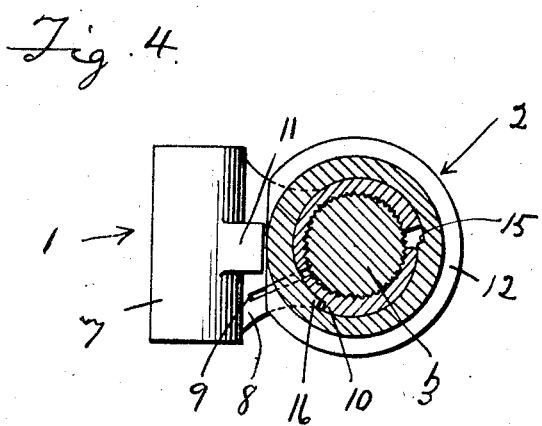
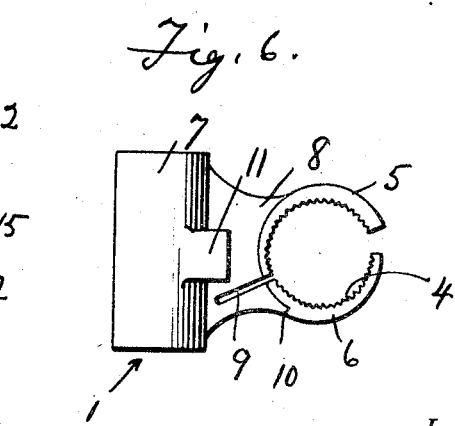
Inventor
Frank J. Wallenberg
Arthur T. McQuinn
By Clarence A. O'Brien
Attorney Patented May 24, 1932

1,859,545

UNITED STATES PATENT OFFICE

FRANK J. WALLENBERG AND ARTHUR McQUINN, OF TONAWANDA, NEW YORK, ASSIGNORS, BY MESNE ASSIGNMENTS, TO JIFFY BATTERY TERMINAL CORPORATION, OF BUFFALO, NEW YORK, A CORPORATION OF NEW YORK

BATTERY TERMINAL

Application filed March 21, 1927. Serial No. 177,048.

The present invention relates to an improved connector which is known in the art as a terminal connector, that is, a device which is adapted to couple an electricity conductor cable to a terminal post such as that on a storage battery.

An object of the invention is to improve connectors for terminals of storage batteries.

Another object is to provide an improved connector which may be easily and rapidly applied to or removed from battery terminals without danger of injury to the battery, with which corrosion will be reduced to a minimum, which will provide and maintain a good and firm electrical connection to the battery terminal even under severe service conditions, and which will be relatively simple, practical, durable, effective, compact and inexpensive.

In the drawings:

Fig. 1 is a side elevation of a connector constructed in accordance with the invention and showing its association with the battery post.

Fig. 2 is a top plan view of the same.

Fig. 3 is a section taken approximately on the plane of the line 3—3 of Fig. 2.

Fig. 4 is a horizontal section taken on the line 4—4 of Fig. 1, looking downwardly.

Fig. 5 is a detail view of a cable retaining bushing, and

Fig. 6 is a top plan view of one of the parts of the terminal.

In the illustrated embodiment of the invention, the improved connector includes a contractible ring 1, and a clamping member 2 assembled on said ring. The passage of the ring is of a size and shape to fit over the battery terminal post 3 to which it is to be connected. If the post is tapered, this passage will be similarly tapered. The inner surface of the ring is preferably provided with a plurality of ribs 4 projecting inwardly into the passage of the ring and extending in a direction endwise of the ring, so that when the ring is contracted upon the battery terminal post upon which it is mounted, the ribs 4 will be forced into or will bite into the post sufficiently to prevent rotation of the ring upon the post. Since the ribs extend in a direction endwise of the ring, and therefore in a direction endwise of the post, such ribs will not offer material resistance to removal of the ring by forcing it upwardly from the post when the ring is expanded or released.

While the ring may be made contractible in any desired manner, it is preferably slit endwise at one side, as by a slot 4a which extends from end to end of the ring, thus dividing the ring into two arms which, owing to the resiliency of the material of the ring, may be sprung together to grip the terminal post, and when released will spring apart to permit easy removal of the ring. The outer periphery or surface of the ring on opposite sides of the slot 4a has cam surfaces 5 and 6 which extend peripherally of the ring at approximately diametrically opposite points, such surfaces being slightly eccentric with respect to the axis of the inner surface of the ring. The inner surface of the clamping member 2 has similar but reverse cam surfaces, and therefore when the member 2 is mounted upon the ring and rotated about the axis of the passage of the ring, the cooperating cam surfaces of the clamping member 2 and the ring 1 will cause a contraction of the ring upon the post 3 and a biting of the ribs into the post 3.

To release the clamping action, it is merely necessary to rotate the member 2 in the reverse direction, and the cam surfaces will move in a direction to provide clearance between them and release the ring. The highest point of the cam surface 5 is at the end adjoining the slot 4a so that there will be a shoulder at the slot, and there will be a similar shoulder 10 at the junction between the cam surfaces 5 and 6 at a point spaced peripherally from the slot 4a. The cam surfaces on the inside of the member 2 have similar shoulders 15 and 16 at their junction, and when the cam member 2 is rotated in a reverse direction to release the clamping action upon the ring, the shoulders 15 and 16 will engage against the shoulder 10 and the shoulder at the high point of the cam surface 5 and the slot 4a, and will tend to spring apart the arms of the ring and thereby completely release the ring from the terminal post.

A web 8 extends or projects laterally from the ring at its lower end and at a point approximately opposite from the slot 4a, and at its free end the web terminates in a cylindrical boss 7 having a tapered socket 7a extending from end to end thereof. The boss 7 has a lug or ledge 11 projecting towards the ring at a point spaced above the web 8, and the member 2 has a flange 12 at its lower end which is disposed between the lug or ledge 11 and the web 8. The lug 11 by overhanging the flange 12 prevents removal of the clamping member 2, that is, displacement of the member 2 on the ring in a direction endwise of the ring. The ledge or lug 11 does not restrict rotation of the member 2, however, but only prevents removal of the latter, but when the clamping member 2 is rotated into a position to release the clamping action, a cut away portion or notch 13 in the flange 12 which is then beneath the lug 11 will clear the lug 11 and permit removal of the clamping member. This facilitates assembly of the clamping member upon the ring. The clamping member 2 may have a non-circular portion 14 for receiving a wrench, by means of which the member may be forcibly rotated so as to contract the ring into firm contact with the terminal post.

A tapered member 17 (Fig. 5) may have an external size to fit the tapered socket 7a, and an interior passage 17a of a size to receive one end of the metallic part of a conductor 18. The member 17 is slitted endwise for some distance from its smaller end, as shown in Fig. 5, so that when it is inserted into the tapered socket 7a, with the conductor 18 in the cavity 17a, endwise movement of the member 17 farther into the socket 17a will cause a compression of the tapered member 17 into firm wedging contact with the conductor 18 and with the walls of the socket 7a. This provides a very firm wedgelike connection between the conductor and the extension 8, and when the conductor 18 is pulled in a direction to disconnect it from the boss, it will draw the member 17 into the tapered socket and the tighter it will be wedged.

It will thus be observed that we have provided a very simple, practical and rapid manner of connecting the conductor to the ring 1 without the use of solder. To remove the conductor 18, it is merely necessary to drive the tapered member 17 in a reverse direction through the socket 7a, whereupon the conductor 18 will immediately be released for removal.

Since the slot 4a is diametrically opposite from, instead of adjacent the web 8, there will in reality be two spring arms which may be sprung towards one another in order to more closely fit the terminal post 3 to which it is clamped, and therefore a firmer and more complete contact may be obtained. In order to further increase the resiliency of the ring, the latter may be additionally slit as at 9 extending into the web 8 at a point nearly opposite the slot 4a as shown clearly in Figs. 4 and 6.

It will be obvious that various changes in the details, which have been herein described and illustrated in order to explain the nature of the invention, may be made by those skilled in the art within the principle and scope of the invention as expressed in the appended claims.

Having thus described our invention, what we claim as new is:—

1. A terminal connector or the like, comprising a split ring having an opening of a size to fit over a terminal post, a clamping member surrounding and rotatable upon said ring, said ring and member having cooperating cam parts by which rotation of said member on said ring contracts said ring, and also having additional cooperating interlock portions preventing displacement of said member axially along said ring when said member is in ring contracting position.

2. A terminal connector or the like, comprising a split ring having an opening of a size to fit over a terminal post, a clamping member surrounding and rotatable upon said ring, said ring and member having cooperating cam parts by which rotation of said member on said ring contracts said ring, and also having cooperating interlock portions ineffective to prevent displacement of said member axially along said ring when said member is in a position in which said ring is released, and effective, upon rotation of said member into ring contracting position, to lock said member against said displacement.

3. A terminal connector or the like, comprising a ring having an opening of a size to fit over a terminal post, and an extension from one side thereof at one end, said extension being formed for connection to a conductor, said ring being split its full length at a point spaced peripherally at least 90 degrees from said extension, and a clamping member surrounding said ring above said extension and having cam surfaces acting on said ring to contract it upon rotation of said member.

4. A terminal connector or the like comprising a ring having an opening of a size to fit over a terminal post, an extension from one side thereof and formed for connection to a conductor, the inner surface of said ring having ribs running in a direction endwise of the ring, said ring being slotted its full length at a point spaced peripherally at least 90° from said extension to permit it to contract upon said post, and a clamping member mounted and movable on said ring, said member and ring having cooperating cam surber on said ring to contract or release said ring, whereby said ribs may be forced into biting engagement with said terminal post when the ring is contracted.

5. A terminal connector or the like comprising a ring having an opening of a size to fit over a terminal post, said ring being slotted in a direction endwise of itself to permit it to contract into contact with said post, a clamping member surrounding and rotatable on said ring, said ring and member having cooperating cam parts for causing a clamping of the ring to the post upon rotation of said member, said member and ring having a flange and ledge connection to one another permitting rotation of said member and preventing removal of said member when in ring contracting position on said ring.

6. A terminal connector or the like comprising a contractible ring of a size to fit a terminal post to which it is connected, a clamping member rotatable on said ring, said ring and member having cooperating cam surfaces by which rotation of said member contracts said ring, said ring having an extension for connection to a conductor, and said extension and member having a flange and ledge connection to one another for preventing movement of said clamping member in a direction endwise of said ring.

7. A terminal connector or the like, comprising a contractible ring of a size to fit a terminal post to which it is connected, a clamping member rotatable on said ring, said ring and member having cooperating cam surfaces by which rotation of said member contracts said ring, said ring having an extension for connection to a conductor, said extension having a projecting lug, and said member having a flange engaging beneath said lug and held thereby against movement in a direction endwise of said ring, said flange having a notch aligned with said lug when said clamping member is in ring releasing position, whereby said clamping member may be removed.

8. A terminal connector or the like comprising a split ring having an opening of a size to fit a terminal post to which it is to be connected, said ring having a lateral extension from one end thereof, a clamping member mounted on said ring and rotatable thereon to contract or release said ring, the lower end of said member having a flange, and said extension having a ledge beneath which said flange engages, for holding said clamping member against movement in a direction endwise of said ring.

9. A terminal connector or the like comprising a ring having an opening of a size to fit over a terminal post and an extension projecting laterally therefrom at one end thereof, said ring being slit in an endwise direction sufficiently to permit it to be contracted upon said post, a clamping member surrounding said ring and rotatable thereon, the outer peripheral surface of said ring and the inner peripheral surface of said member having cooperating cam surfaces causing contraction of the ring upon said post when said member is rotated thereon, said extension having a socket for the connection thereto of a conductor, and also having a ledge projecting towards said ring, said member having a portion interlocking with said ledge, whereby said ledge will prevent removal of said member from said ring when said member has been rotated into ring contracting position.

10. In a structure of the class described, a split resilient clamping band adapted to encircle a battery post, said band being provided with internal anti-slipping corrugations and being externally thickened to provide eccentric cam surfaces, a plate-like extension on the band, a stop shoulder on the band, a sleeve carried by said extension and provided with a bore, a clamping member adapted to fit over and rotate on said band, said member being provided with internal cams for frictional contact with said friction cam surfaces, one of the cams being adapted to abut said stop shoulder to stop said member from rotation beyond its release, said member being provided with an outstanding flange flattened on one edge, a retaining lug carried by said sleeve and adapted for cooperation with said flange to confine it on said band, said member being further provided with a portion formed for a tool grip.

In testimony whereof we affix our signatures.

FRANK J. WALLENBERG.
ARTHUR McQUINN.